(12) United States Patent
Onodera et al.

(10) Patent No.: US 7,673,382 B2
(45) Date of Patent: Mar. 9, 2010

(54) EXTERNAL ELECTRODE FORMING METHOD

(75) Inventors: Ko Onodera, Tokyo (JP); Satoshi Kurimoto, Tokyo (JP); Yoji Tozawa, Tokyo (JP); Shirou Ootsuki, Tokyo (JP)

(73) Assignee: TDK Corporation, Tokyo (JP)

( * ) Notice: Subject to any disclaimer, the term of this patent is extended or adjusted under 35 U.S.C. 154(b) by 144 days.

(21) Appl. No.: 11/641,911

(22) Filed: Dec. 20, 2006

(65) Prior Publication Data

US 2007/0166465 A1 Jul. 19, 2007

(30) Foreign Application Priority Data

Jan. 16, 2006 (JP) ............................. 2006-007782

(51) Int. Cl.
*H01C 17/28* (2006.01)
(52) U.S. Cl. .............................. 29/619; 29/621; 29/825; 29/829; 427/76; 427/123; 427/286; 427/355
(58) Field of Classification Search .................... 29/619, 29/621, 825, 829, 854, 868; 427/76, 79, 427/80, 123, 146, 267, 286, 355
See application file for complete search history.

(56) References Cited

U.S. PATENT DOCUMENTS 5,753,299 A  5/1998  Garcia et al.

FOREIGN PATENT DOCUMENTS

| JP | A-5-90107 | | 4/1993 |
|---|---|---|---|
| JP | A-5-175088 | | 7/1993 |
| JP | 06077099 | * | 3/1994 |
| JP | A-6-77099 | | 3/1994 |
| JP | U-6-26245 | | 4/1994 |
| JP | A 2000-030916 | | 1/2000 |
| JP | A-2000-348970 | | 12/2000 |
| JP | A 2001-269616 | | 10/2001 |
| JP | A-2001-345240 | | 12/2001 |
| JP | A 2002-151367 | | 5/2002 |

* cited by examiner

*Primary Examiner*—Thiem Phan
(74) *Attorney, Agent, or Firm*—Oliff & Berridge, PLC

(57) ABSTRACT

A method of forming an external electrode of an electronic component involving: a paste preparation step, a removal step, an element preparation step, a contact step, and a formation step. A jig with a groove into which an element forming the electronic component can be inserted is prepared. A conductive paste is filled in the groove, and then removed, so as to leave the conductive paste along a first wall surface of the groove and remove the rest. Then, element immediately above the groove is located, and inserted into the groove and moved toward the first wall surface. Finally, the element is moved along the first wall surface and toward the aperture in a state in which the ridgeline of the element is kept in contact with the first wall surface, and moved away from the first wall surface so as to separate the ridgeline from the first wall surface.

1 Claim, 10 Drawing Sheets (A)

(B)

(A)

(B)

EXTERNAL ELECTRODE FORMING METHOD

CROSS-REFERENCED TO RELATED DOCUMENT

This application claims priority to Japanese Patent Application No. 2006-007782, filed on Jan. 16, 2006.

BACKGROUND OF THE INVENTION

1. Field of the Invention

The present invention relates to a method of forming an external electrode of an electronic component.

2. Related Background Art

With downsizing of electronic devices and others in recent years, electronic components used therein are also being downsized. Downsizing is particularly significant for surface-mounted electronic components by virtue of improvement in mount technology. External electrodes for mounting on a substrate need to be formed on these electronic components, and a plurality of external electrodes are sometimes formed on side and end faces of a component according to need. There are a variety of proposals on methods of forming the external electrodes.

One of the methods of forming the external electrodes of the electronic components is the method described in U.S. Pat. No. 5,753,299. This method is to form external electrodes on an end face of a chip being an element to become an electronic component, and on side faces adjacent to the end face. More specifically, consecutively projecting portions called fingers of a comb-shaped plate are arranged at positions opposite to the end face of the chip, and a conductive paste for formation of external electrodes is applied onto tips of the fingers. Subsequently, the fingers are brought into contact with the chip and are slid in directions perpendicular to the extending direction of the chip to rub the conductive paste onto the chip, thereby forming external electrodes.

SUMMARY OF THE INVENTION

When the external electrodes are formed by rubbing the conductive paste onto the end face of the chip as described above, the external electrodes formed on the side faces are formed by downward flows of the conductive paste. More specifically, the conductive paste scraped off by a ridgeline between the end face and each side face flows down the side face of the chip to form the external electrodes on the side face. For this reason, shapes of the external electrodes formed on the side face of the chip are affected by the viscosity of the conductive paste or the like. However, it is difficult to freely control the viscosity of the conductive paste and it is thus difficult to control the lengths of the external electrodes from the ridgeline on each side face of the chip by adjustment of the viscosity of the conductive paste.

Then the Inventors conducted research from a variety of viewpoints on how to control the length of the external electrode by methods other than the adjustment of viscosity of the conductive paste. As an initial step of the research, the Inventors investigated whether the length of the external electrode could be controlled by adjusting an amount of the conductive paste scraped off by the ridgeline between the end face and the side face of the chip. From this investigation, the Inventors found that an increase in the amount of the conductive paste increased the length of an extension of the external electrode on the side face of the chip in the direction away from the ridgeline and along the side face, but also inevitably increased the width of an extension in the direction along the ridgeline. It is seen from this expertise that a sufficient distance is not always assured between adjacent external electrodes and that it could result in a short circuit between the electrodes.

In the next step of the investigation, the Inventors found that a decrease in the amount of the conductive paste for assuring the distance between adjacent external electrodes resulted in decreasing the downward flow amount and restricting the extension length in the direction away from the ridgeline of the external electrode and that it could result in failing to assure a sufficient area of the external electrode. After further research, the Inventors discovered that when the external electrode was formed by scraping off the conductive paste by the ridgeline as described, the state of the external electrode on the side face was affected by the level of the downward flow of the conductive paste, the shape thereof was sometimes unstable, and, when the chip was mounted on a substrate, it could cause the Manhattan phenomenon.

An object of the present invention is therefore to provide a method of forming an external electrode of an electronic component, by which the external electrode can be formed on a stable basis.

An external electrode forming method according to the present invention is a method of forming an external electrode of an electronic component, comprising: a step of preparing a jig with a groove in which an element forming the electronic component can be inserted, wherein the groove includes at least a first wall surface inclined outward in a direction from an interior toward an aperture; a paste preparation step of filling a conductive paste in the groove; a removal step of removing the filled conductive paste so as to leave the conductive paste at least along the first wall surface and remove the rest; an element preparation step of locating the element immediately above the groove; a contact step of inserting the element into the groove and moving the element toward the first wall surface to bring a ridgeline of the element into contact with the first wall surface; and a formation step of moving the element in a state of the contact along the first wall surface of the groove and toward the aperture and moving the element away from the first wall surface so as to separate the ridgeline at least from the first wall surface.

According to the present invention, the element is moved toward the first wall surface to bring a ridgeline of the element into contact with the first wall surface; therefore, an angle of contact between one face of the element and the first wall surface is acute. Then the element in the contact state is moved along the first wall surface of the groove and toward the aperture, whereby an electrode portion can be stably formed in an intended shape. Particularly, by controlling a moving distance of the element along the first wall surface and toward the aperture in the state in which the element is in contact with the first wall surface, the length of the electrode portion formed on one face of the element can be controlled in the direction away from the ridgeline.

In the present invention, the element is moved along the first wall surface of the groove and toward the aperture in the state in which the element is in contact with the first wall surface, and the element is moved away from the first wall surface so as to separate the ridgeline at least from the first wall surface. This results in applying a sufficient amount of the conductive paste along the ridgeline. Therefore, the external electrode can be stably formed in an intended thickness. Particularly, a sufficient thickness can be secured at a corner of the element.

Preferably, the method comprises an inclining step of further moving the element toward the first wall surface to incline the element so as to follow the first wall surface, after the contact step.

By this step, the element is inclined so as to follow the first wall surface, and thus the angle of contact between one face of the element and the first wall surface becomes acuter. Therefore, an electrode portion can be stably formed in an intended shape on the one face. Particularly, by controlling the angle of contact between the one face of the element and the first wall surface, the length of the electrode portion formed on the one face of the element can be controlled in the direction away from the ridgeline.

Another external electrode forming method of the present invention is a method of forming external electrodes of an electronic component, comprising: a step of preparing a jig in which a plurality of platelike members, each being provided with a groove into which an element forming the electronic component can be inserted, are arranged along each other, wherein each of the grooves includes at least a first wall surface inclined outward in a direction from an interior toward an aperture; a preparation step of filling a conductive paste in each of the grooves so as to cover across the grooves of the respective platelike members; a removal step of removing the conductive paste existing between the platelike members and thereby leaving the conductive paste in each of the grooves, at least along the first wall surface of each groove; an element preparation step of locating the element forming the electronic component, immediately above the grooves; a contact step of inserting the element into the grooves so as to extend across the grooves, and moving the element toward the first wall surfaces of the respective grooves to bring a ridgeline of the element into contact with the first wall surfaces; and a formation step of moving the element in a state of the contact along the first wall surfaces of the respective grooves and toward the aperture and moving the element away from the first wall surfaces so as to separate the ridgeline at least from the first wall surfaces of the respective grooves.

According to the present invention, the conductive paste is filled in the grooves of the platelike members arranged along each other, and the conductive paste present between the platelike members is then removed, whereby the excess conductive paste filled in the grooves flows out. Therefore, the conductive paste can be left along the wall surfaces of the respective grooves of the platelike members.

Since the element is moved toward the first wall surfaces to bring a ridgeline of the element into contact with the first wall surfaces of the respective grooves, the angles of contact between one face of the element and the first wall surfaces are acute. Then the element in the contact state is moved along the first wall surfaces of the respective grooves and toward the aperture, whereby electrode portions can be stably formed in an intended shape and at a plurality of locations on the one face. Particularly, by controlling a moving distance of the element along the first wall surfaces of the grooves and toward the aperture in the state in which the element is in contact with the first wall surfaces, the length of the electrode portions formed alongside at a plurality of locations on the one face of the element can be controlled in the direction away from the ridgeline.

Since the element is moved away from the first wall surfaces so as to separate the ridgeline at least from the first wall surfaces of the respective grooves, sufficient amounts of the conductive paste are applied along the ridgeline. Therefore, the external electrodes can be stably formed in an intended thickness. Particularly, a sufficient thickness can be secured at a corner of the element.

The present invention enables stable formation of the external electrode in intended shape and thickness.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The expertise of the invention can be readily understood in view of the following detailed description with reference to the accompanying drawings presented by way of illustration only. Subsequently, embodiments of the present invention will be described with reference to the accompanying drawings. The same portions will be denoted by the same reference symbols as much as possible, without redundant description.

First Embodiment

Figure 1:
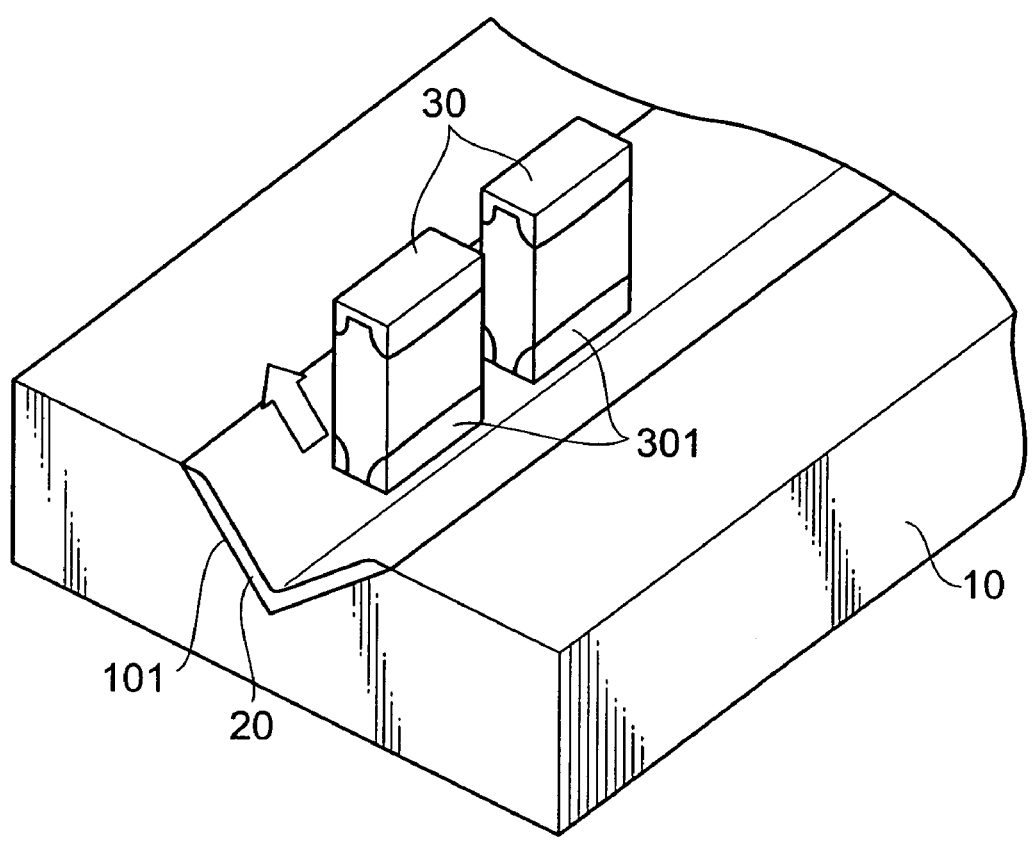
FIG. 1 is a drawing showing an outline of an external electrode forming method as a first embodiment of the present invention.

An external electrode forming method, which is the first embodiment of the present invention, will be described below. The external electrode forming method of the present embodiment is outlined as follows: as shown in FIG. 1, an application bed 10 (jig) with a groove 101 of a V-shaped cross section (a groove with wall surfaces inclined outward in the direction from the interior toward the aperture) is prepared, and a conductive paste 20 is attached so as to lie along the wall surfaces of the groove 101. After that, chips 30 (elements) are inserted into the groove 101, the chips 30 are brought into contact with a wall surface, and the chips are moved along a direction of an arrow in the drawing. The chips 30 are further moved away from the wall surface to form an external electrode 301 on a side face of each chip 30. Subsequently, the external electrode forming method will be detailed below.

Figure 2:
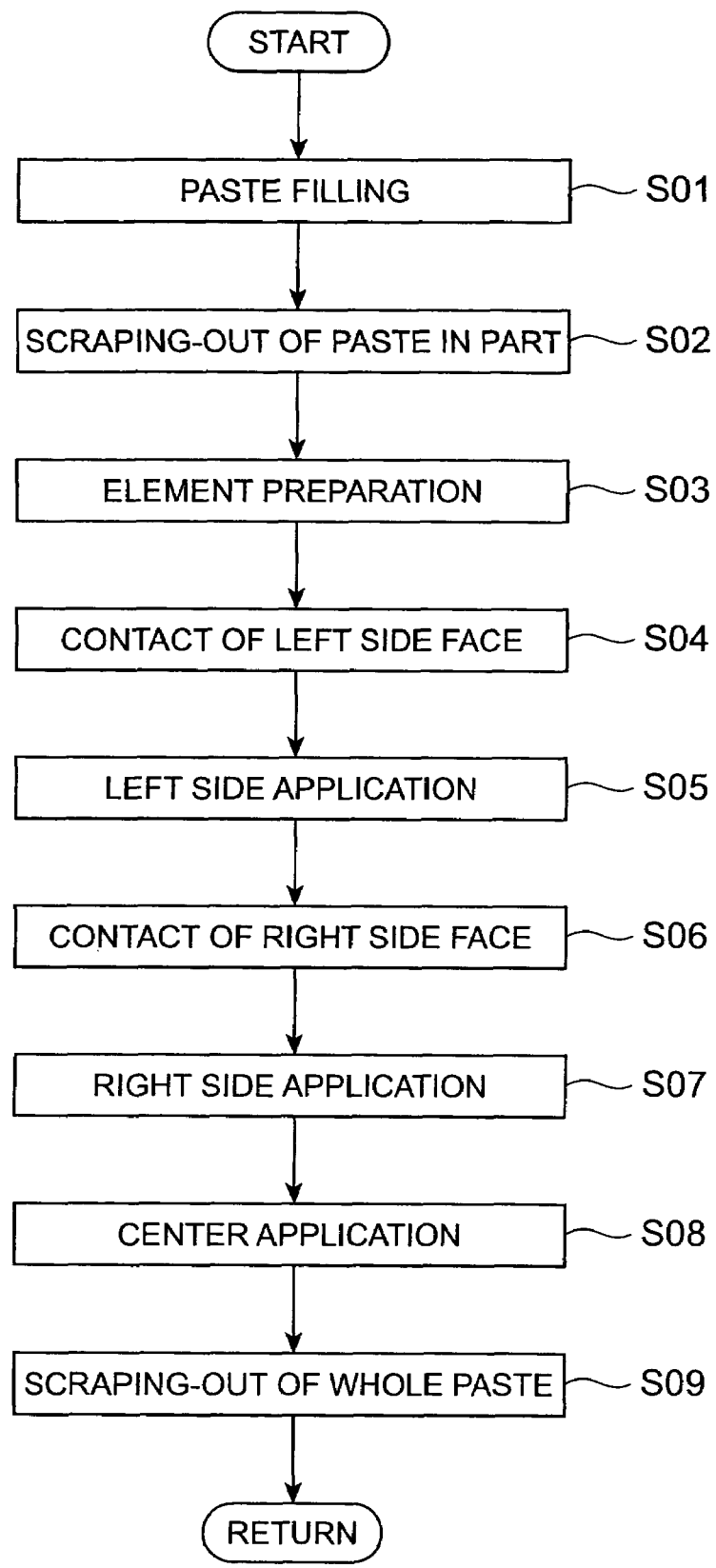
FIG. 2 is a drawing showing the external electrode forming method as the first embodiment of the present invention.

FIG. 2 is a drawing for explaining the procedure of the external electrode forming method of the present embodiment. FIGS. 3 to 7 are views of chip 30 and application bed 10 from the direction along the groove 101, and views showing states of respective steps in the external electrode forming method. The method will be described along the flow shown in FIG. 2 and with reference to FIGS. 3 to 7 on an as-needed basis.

Figure 3:
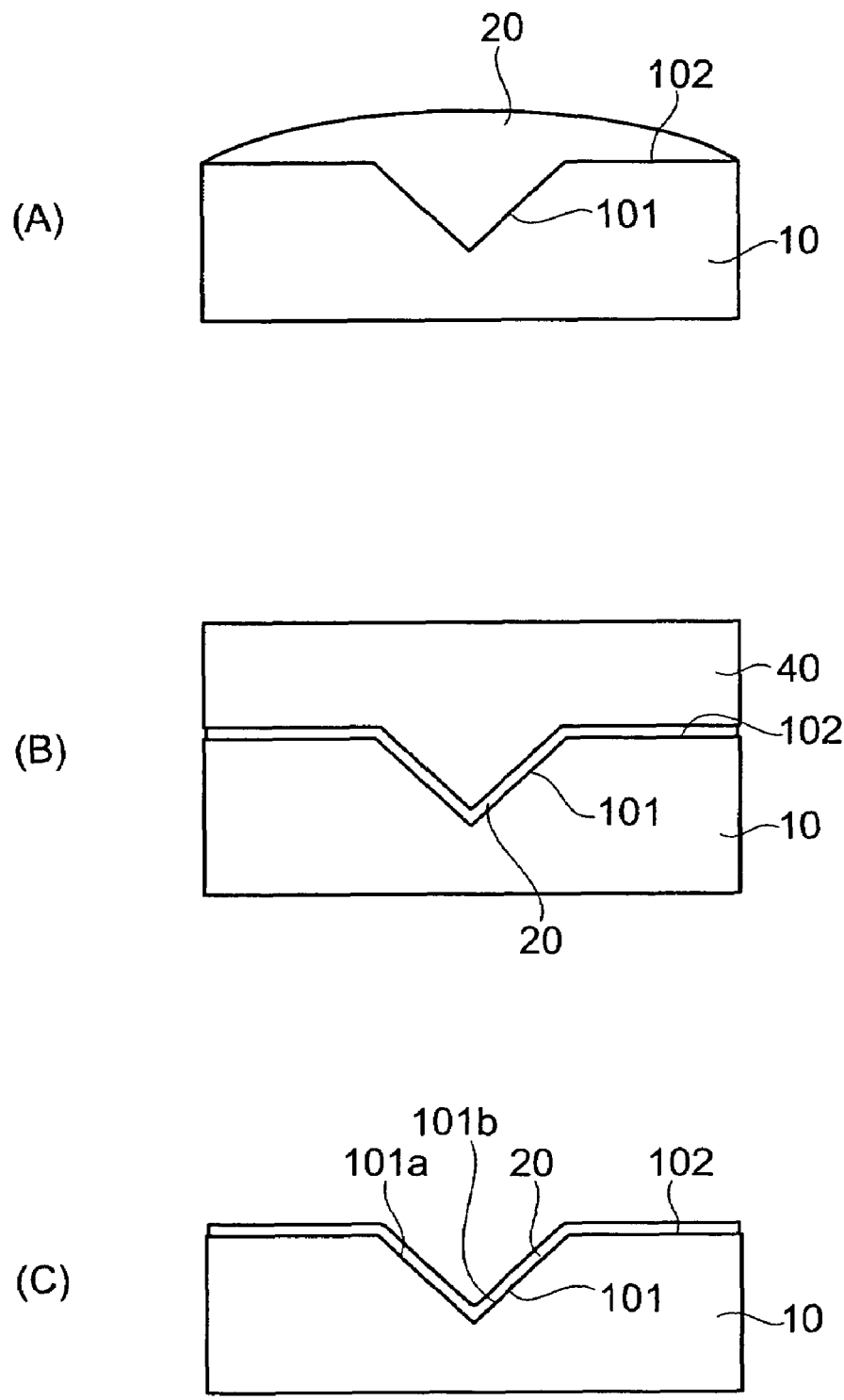
FIGS. 3 to 7 are views for explaining the external electrode forming method as the first embodiment of the present invention.

The application bed 10 (jig) with the groove 101 of the V-shaped cross section is prepared and the conductive paste 20 is filled in the groove 101 and on a principal surface 102 of the application bed 10 (step S01 in FIG. 2, (A) in FIG. 3, preparation step).

Subsequently, a blade 40 is used to scrape out the conductive paste in the groove 101 and on the principal surface 102 (step S02 in FIG. 2, (B) in FIG. 3, removal step). As shown in (B) in FIG. 3, the blade 40 has a projection that can be put in the groove 101, and the blade 40 is arranged so that a certain clearance is made relative to the groove 101 and principal surface 102. Therefore, as shown in (C) in FIG. 3, the conductive paste 20 is left along wall surfaces 101a, 101b of the groove 101 and along the principal surface 102, and the rest is removed.

Subsequently, a chip 30 is located immediately above the groove 101 (step S03 in FIG. 2, (A) in FIG. 4, element preparation step). At this time, the chip 30 is located so that an extension of a center line L of the chip 30 coincides with a bottom 101c of the groove of the V-shaped cross section. The chip 30 is held as pasted to an adhesive tape 51 provided on a holding plate 50.

Figure 4:
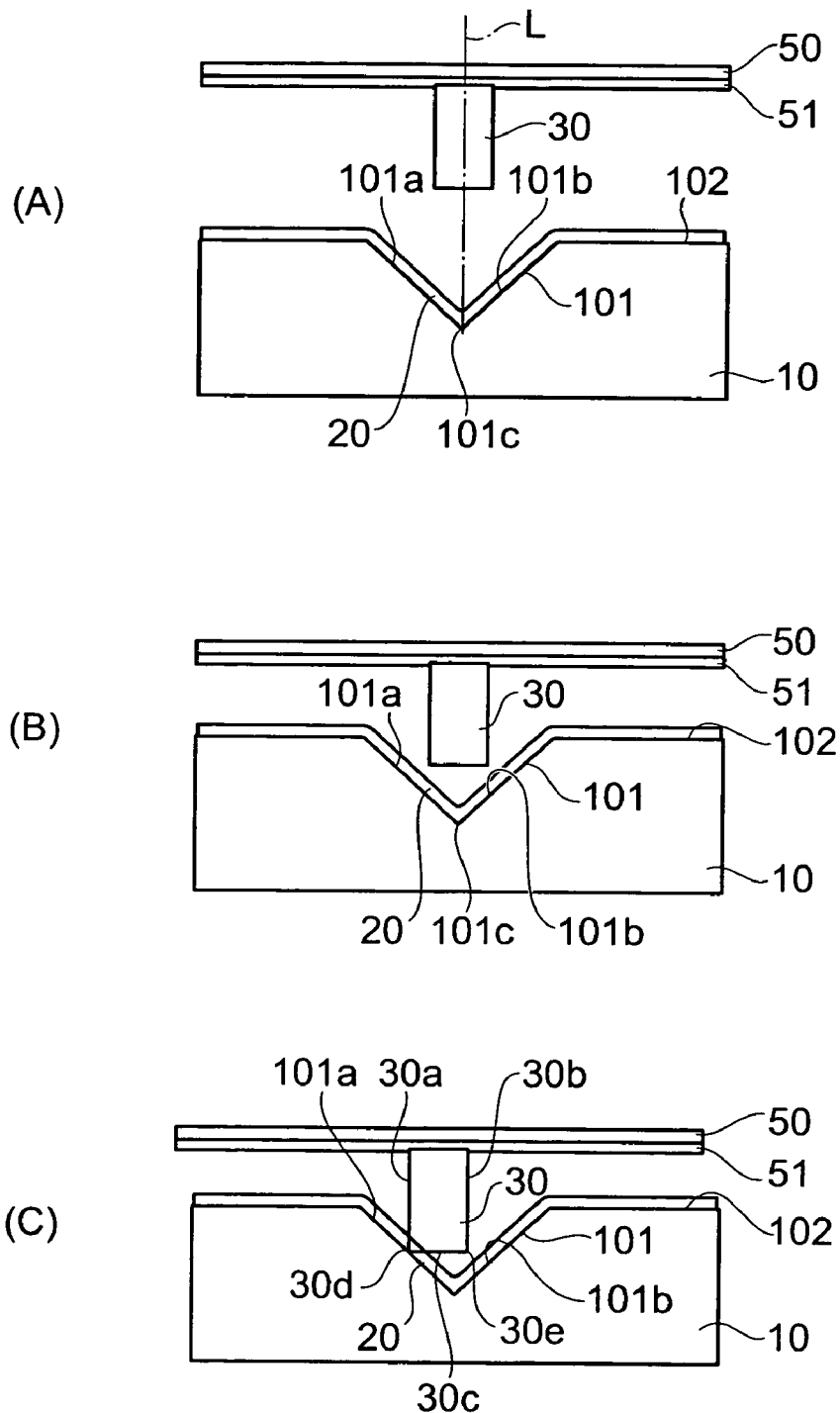

Next, the holding plate 50 is moved vertically downward to a position where the tip of the chip 30 is located in the groove 101 ((B) in FIG. 4). Subsequently, relative movement is effected between the holding plate 50 and the application bed 10 so as to bring a side face 30a of the chip 30 closer to the wall surface 101a of the groove 101 (step S04 in FIG. 2, (C) in FIG. 4, contact step). This relative movement between the holding plate 50 and the application bed 10 results in bringing a ridgeline 30d between the side face 30a and an end face 30c of the chip 30 into contact with the wall surface 101a of the groove 101. At this time, the angle of contact between the side face 30a of the chip 30 and the wall surface 101a of the groove 101 is acute.

Figure 5:
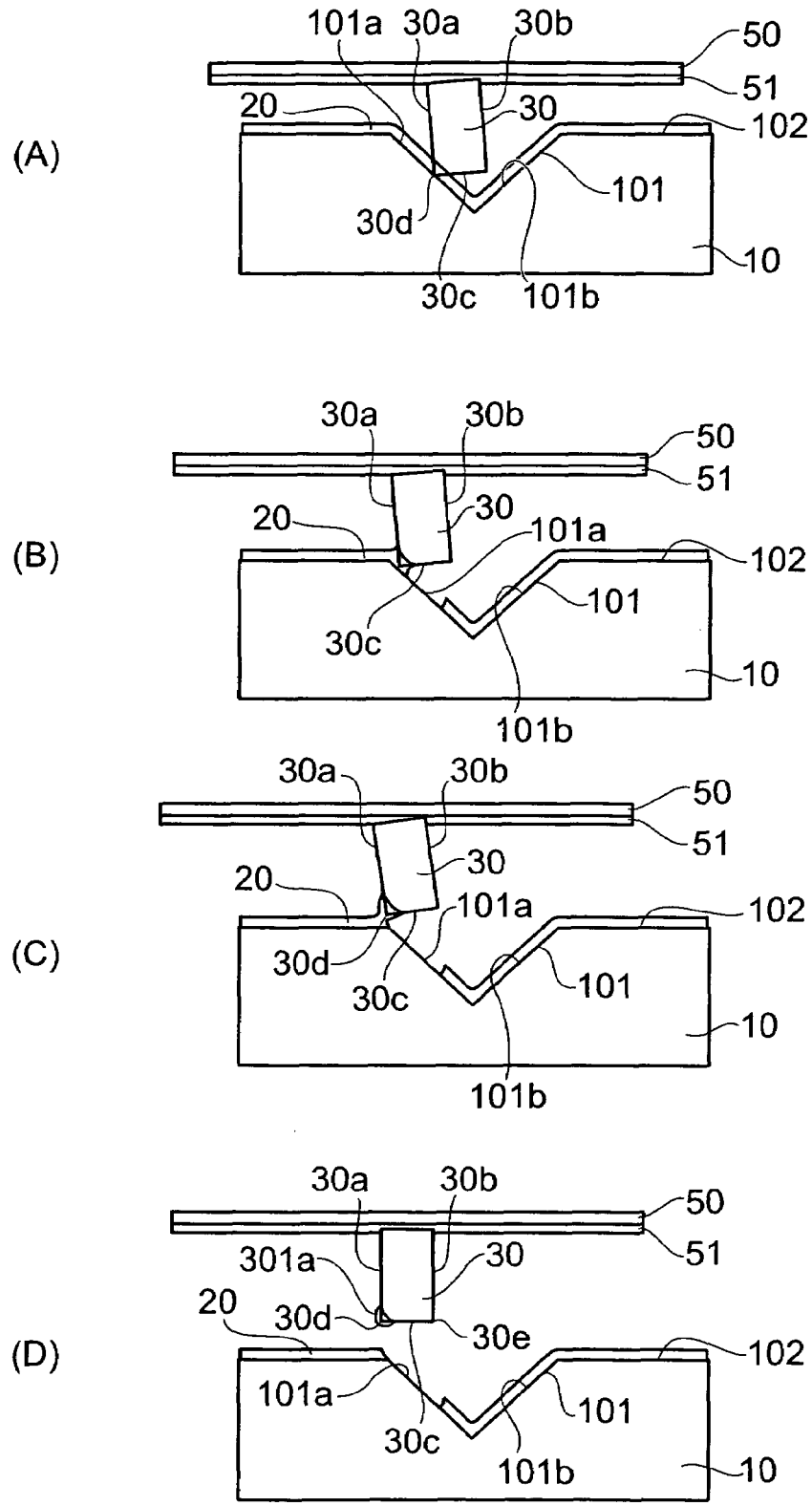

Further relative movement between the holding plate 50 and the application bed 10 results in bringing the chip 30 into a further inclined state toward the wall surface 101a of the groove 101 as shown in (A) in FIG. 5. This makes the contact angle acuter, whereby an electrode portion can extend in the direction away from the ridgeline and can be stably formed in an intended shape on the side face 30a of the chip 30. By controlling the contact angle, the length of the electrode portion formed on the side face 30a of the chip 30 can be controlled in the direction away from the ridgeline.

From the state of (A) in FIG. 5, the chip 30 is moved along the wall surface 101a of the groove 101 and toward the aperture of the groove 101, to scrape off the conductive paste 20 attached to the application bed 10 ((B) in FIG. 5). By controlling a distance of movement of the chip 30, the length of the electrode portion formed on the side face 30a of the chip 30 can be controlled in the direction away from the ridgeline.

Furthermore, the chip 30 is moved away from the wall surface 101a of the groove 101 so as to separate the ridgeline 30d between the side face 30a and the end face 30c of the chip 30 from the wall surface 101a of the groove 101 (step S05 in FIG. 2, (D) in FIG. 5, formation step). This results in forming an electrode portion 301a on the side face 30a and ridgeline 30d of the chip 30. Since the conductive paste is separated so as to thread in the process of moving the ridgeline 30d between the side face 30a and the end face 30c of the chip 30 away from the wall surface 101a of the groove 101 ((C) in FIG. 5), a sufficient amount of the conductive paste is applied along the ridgeline 30d. Therefore, a sufficient thickness can be secured at the corner of the element.

Subsequently, an electrode portion is formed on another side face 30b opposite to the side face 30a of the chip 30. Since this step is similar to the forming method of the electrode portion 301a, description thereof with reference to drawings is omitted herein. The chip 30 is moved to a position similar to that in (A) in FIG. 4, i.e., to immediately above the groove 101, and then the holding plate 50 is moved vertically downward to a position similar to that in (B) in FIG. 4, i.e., to a position where the tip of the chip 30 is located in the groove 101.

Subsequently, relative movement is effected between the holding plate 50 and the application bed 10 to bring the side face 30b of the chip 30 closer to the wall surface 101b of the groove 101 (step S06 in FIG. 2). This relative movement between the holding plate 50 and the application bed 10 results in bringing a ridgeline 30e between the side face 30b and the end face 30c of the chip 30 into contact with the wall surface 101b of the groove 101. At this time, the angle of contact between the side face 30b of the chip 30 and the wall surface 101b of the groove 101 is acute.

Further relative movement between the holding plate 50 and the application bed 10 brings the chip 30 into a further inclined state toward the wall surface 101b of the groove 101. Since this makes the contact angle acuter, an electrode portion can extend in the direction away from the ridgeline and can be stably formed in an intended shape on the side face 30b of the chip 30. By controlling the contact angle, the length of the electrode portion formed on the side face 30b of the chip 30 can be controlled in the direction away from the ridgeline.

From the state in which the chip 30 is further inclined toward the wall surface 101b of the groove 101, the chip 30 is moved along the wall surface 101b of the groove 101 and toward the aperture of the groove 101 to scrape off the conductive paste 20 attached to the application bed 10. By controlling a distance of movement of the chip 30, the length of the electrode portion formed on the side face 30b of the chip 30 can be controlled in the direction away from the ridgeline.

Furthermore, the chip 30 is moved away from the wall surface 101b of the groove 101 so as to separate the ridgeline 30e between the side face 30b and the end face 30c of the chip 30 from the wall surface 101b of the groove 101. This results in forming the electrode portion 301b on the side face 30b and ridgeline 30e of the chip 30 (step S07 in FIG. 2).

Figure 6:
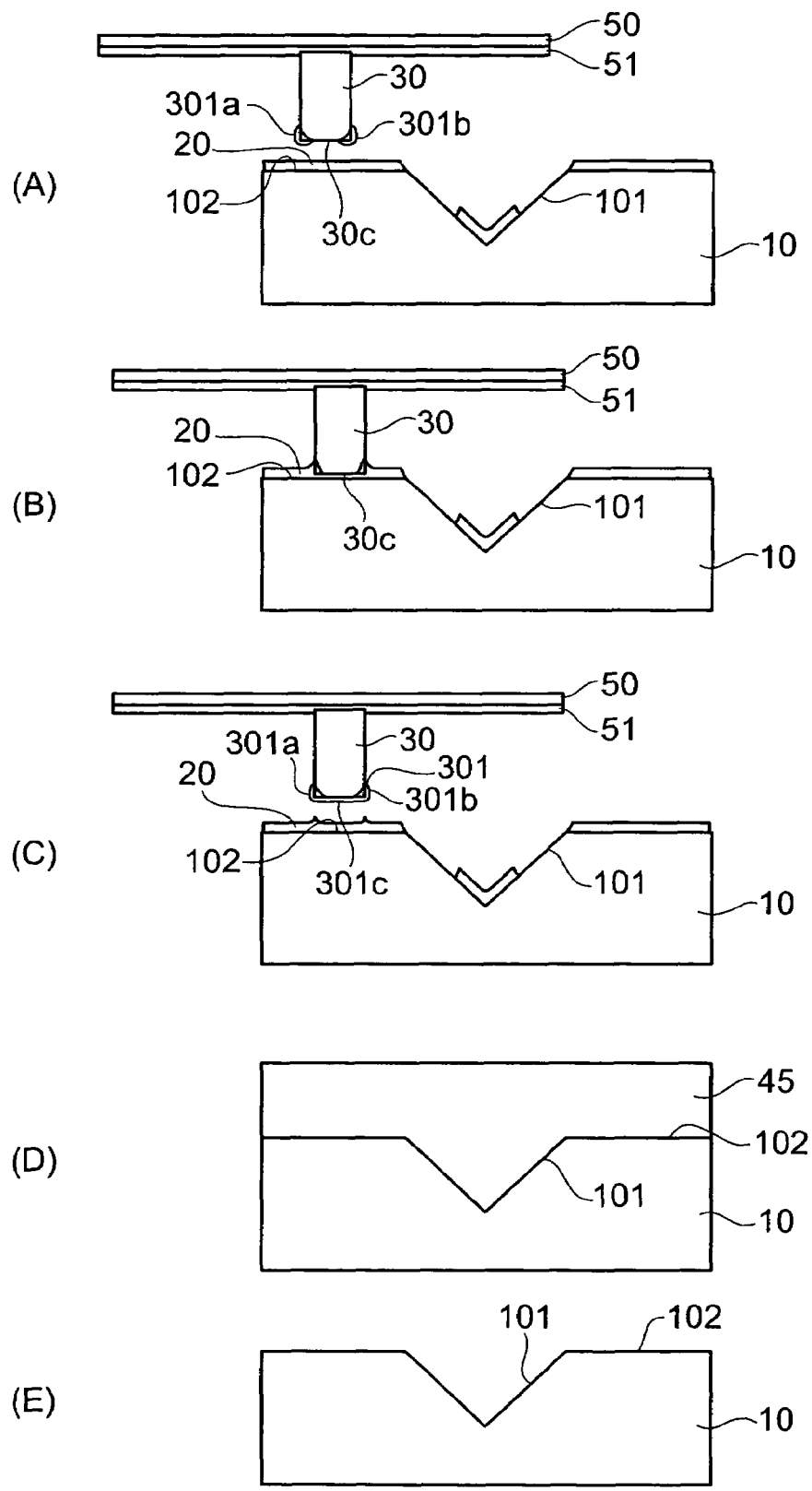
Figure 7:
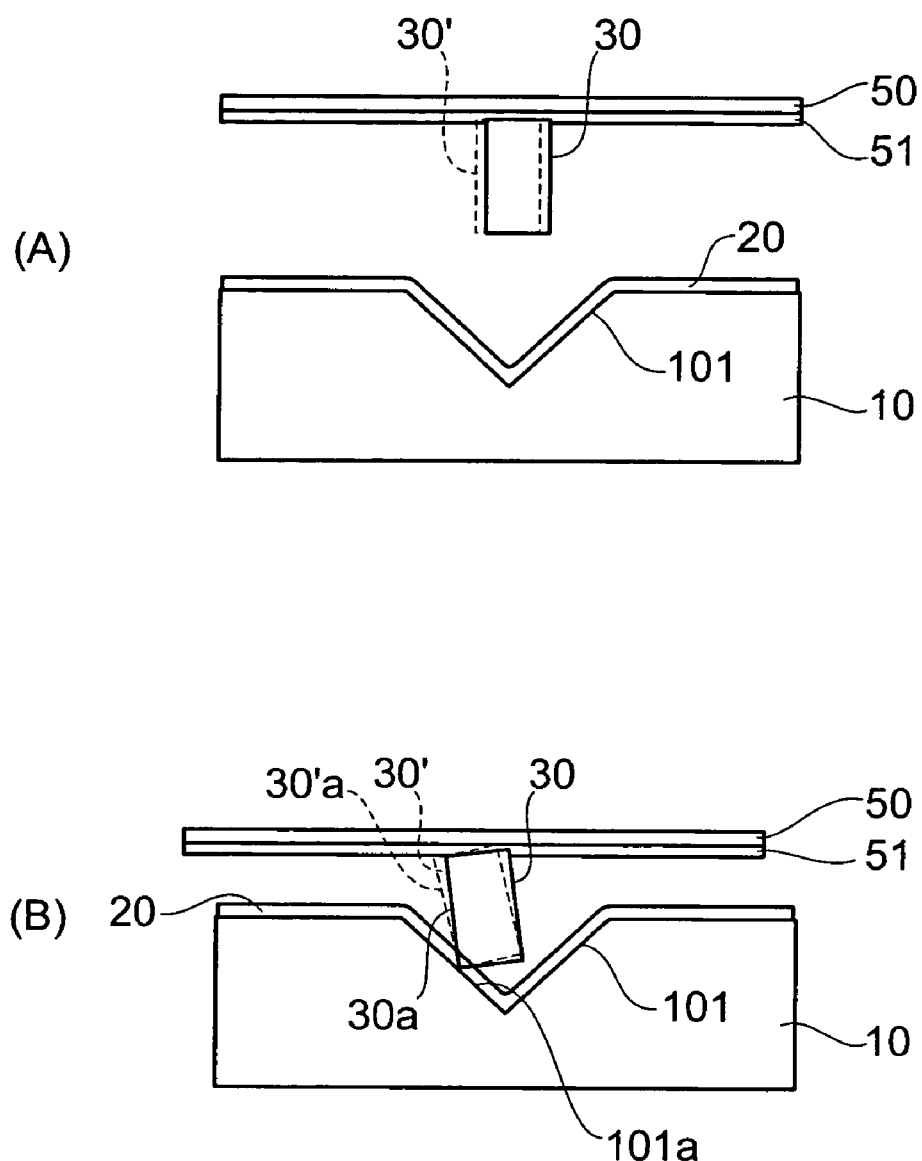

Subsequently, relative movement is effected between the holding plate 50 and the application bed 10 so as to locate the chip 30 above the principal surface 102 of the application bed 10 ((A) in FIG. 6). From that position, the holding plate 50 is moved toward the application bed 10 so as to bring the end face 30c of the chip 30 into contact with the principal surface 102 ((B) in FIG. 6). When the end face 30c of the chip 30 is brought into contact with the principal surface 102, an electrode portion 301c is formed to connect between the electrode portion 301a and the electrode portion 301b (step S08 in FIG. 2).

Subsequently, the holding plate 50 is moved away from the application bed 10, and the chip 30 is dried, whereby an external electrode 301 is formed in a configuration in which the electrode portion 301a, the electrode portion 301b, and the electrode portion 301c connect with each other ((C) in FIG. 6).

Subsequently, a blade 45 is used to scrape out the conductive paste in the groove 101 and on the principal surface 102 (step S09 in FIG. 2, (D) in FIG. 6). As shown in (D) in FIG. 6, the blade 45 is so convex as to be fitted in the groove 101. The blade 45 is different from the blade 40 shown in (B) in FIG. 3, in that no clearance is made between the blade 45 and the groove 101 and principal surface 102. Therefore, as shown in (E) in FIG. 6, the conductive paste is completely scraped out from in the groove 101 and on the principal surface 102.

In the present embodiment, as described above, each of the side faces 30a, 30b of the chip 30 is moved toward the wall surface 101a or 101b of the groove 101 opposed to the face, to bring each of the ridgelines 30d, 30e of the chip 30 into contact with the corresponding wall surface 101a, 101b of the groove 101. This makes the angle of contact acute between the side face 30a of the chip 30 and the wall surface 101a of the groove 101 or between the side face 30b of the chip 30 and the wall surface 101b of the groove 101. Then each of the ridgelines 30d, 30e of the chip 30 is moved along the wall surface 101a, 101b and toward the aperture in the state in which it is in contact with the wall surface 101a, 101b of the groove 101. This permits the electrode portion to be stably formed in the intended shape.

After the contact step, further relative movement is effected between the holding plate 50 and the application bed 10 to control the angle of contact between the side face 30a of the chip 30 and the wall surface 101a of the groove 101 or between the side face 30b of the chip 30 and the wall surface 101b of the groove 101. The method is also arranged to control the moving distance of each of the ridgelines 30d, 30e of the chip 30 along the wall surface 101a, 101b and toward the aperture in the state in which the ridgeline is kept in contact with the wall surface 101a, 101b of the groove 101. These permit us to control the lengths of the electrode portions formed on the side face 30a and on the side face 30b of the chip 30, in the direction away from the ridgeline.

Each of the ridgelines 30d, 30e of the chip 30 is moved along the wall surface 101a, 101b and toward the aperture in the state in which it is kept in contact with the wall surface 101a, 101b of the groove 101, and the chip 30 is moved away from the wall surface 101a, 101b of the groove 101 so as to separate the ridgeline 30d, 30e of the chip 30 from the wall surface 101a, 101b of the groove 101. This results in applying a sufficient amount of the conductive paste along the ridgeline 30d, 30e of the chip 30. Therefore, the external electrode can be stably formed in an intended thickness. Particularly, a sufficient thickness can be secured at each corner of the chip 30.

In a case of an operation in which a plurality of chips 30 are aligned along the groove 101, each of the chips 30 can be appropriately brought into contact with the wall surface 101a of the groove 101. In a case where some chips 30' are placed a little apart from the predetermined position (the position of chip 30) in the element preparation step as shown in FIG. 7(A), there appears only a small difference of contact angle between the side faces 30a and 30'a of the respective chips 30 and 30' and the wall surface 101a of the groove 101 in the contact step, as shown in FIG. 7(B). Therefore, the same amount of the conductive paste is applied onto the side faces of the respective chips, and the external electrode can be stably formed in the intended shape on each of the chips.

Second Embodiment

Figure 8:
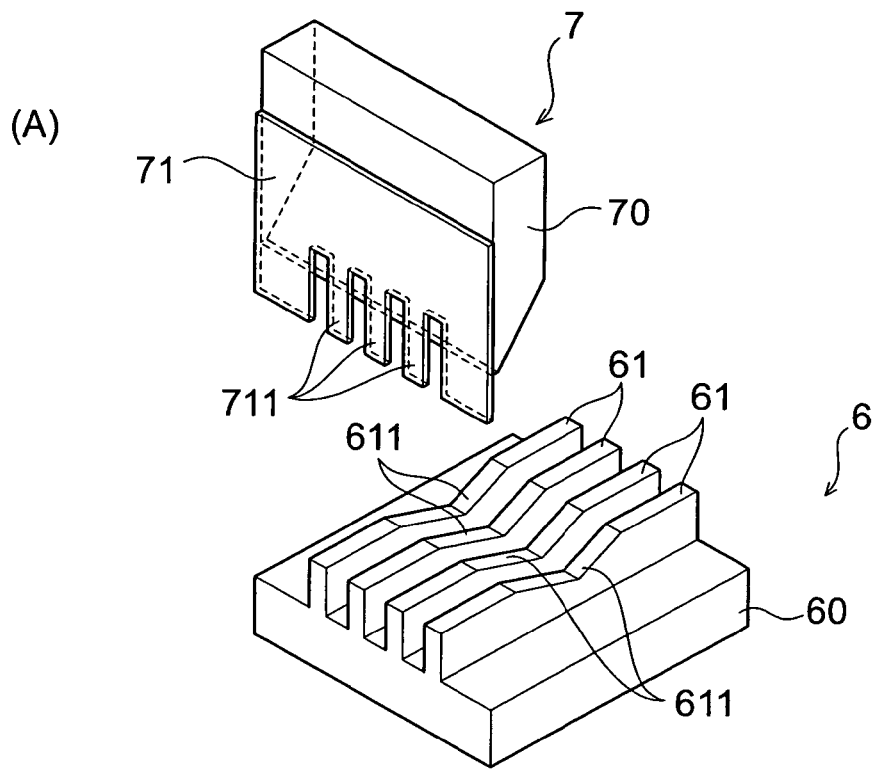
FIGS. 8 to 10 are views for explaining an external electrode forming method as a second embodiment of the present invention.
Figure 8:
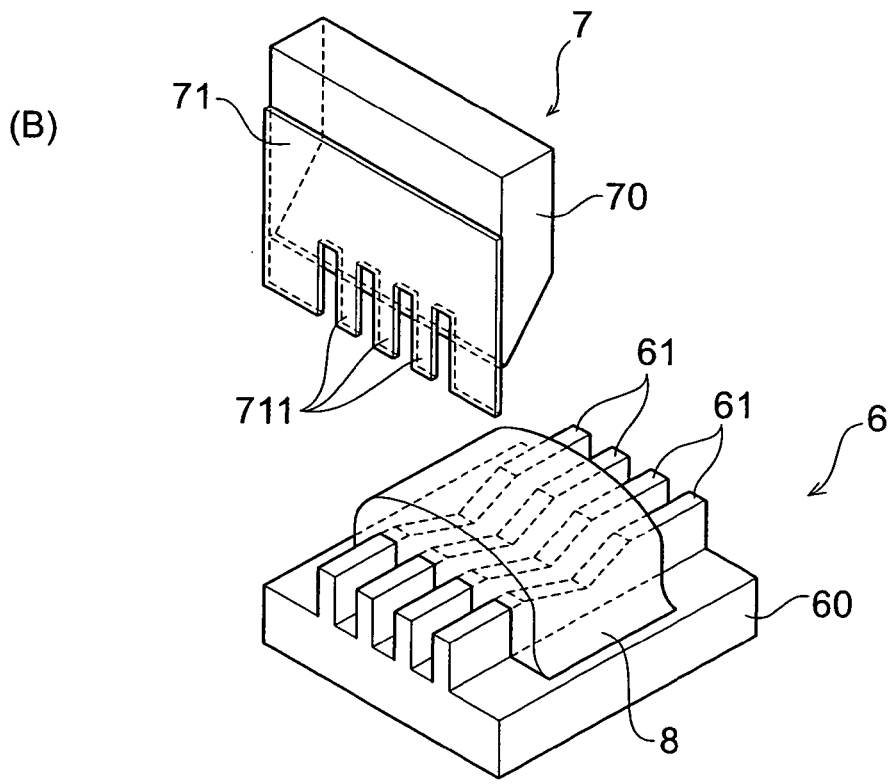
Figure 9:
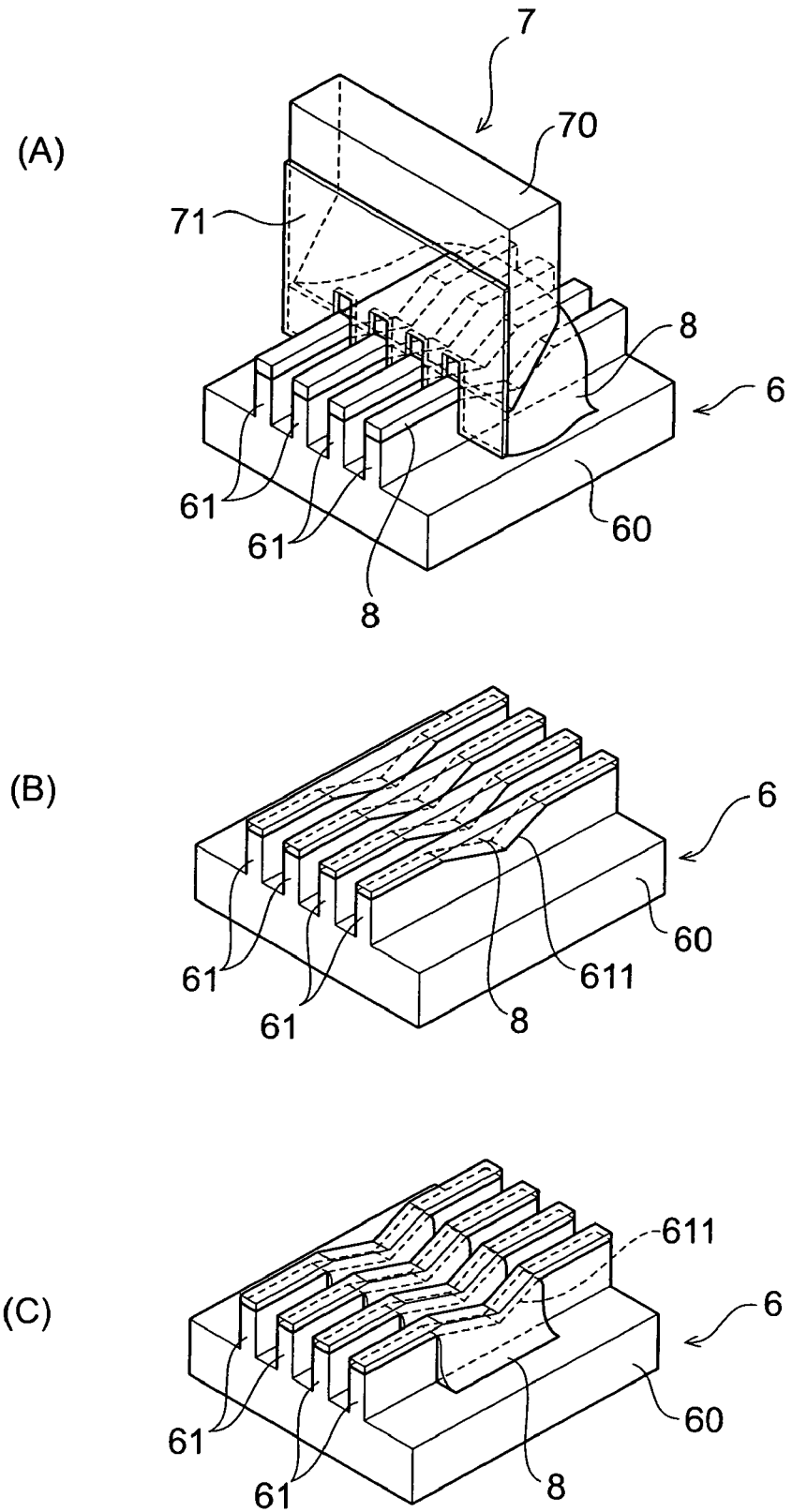
Figure 10:
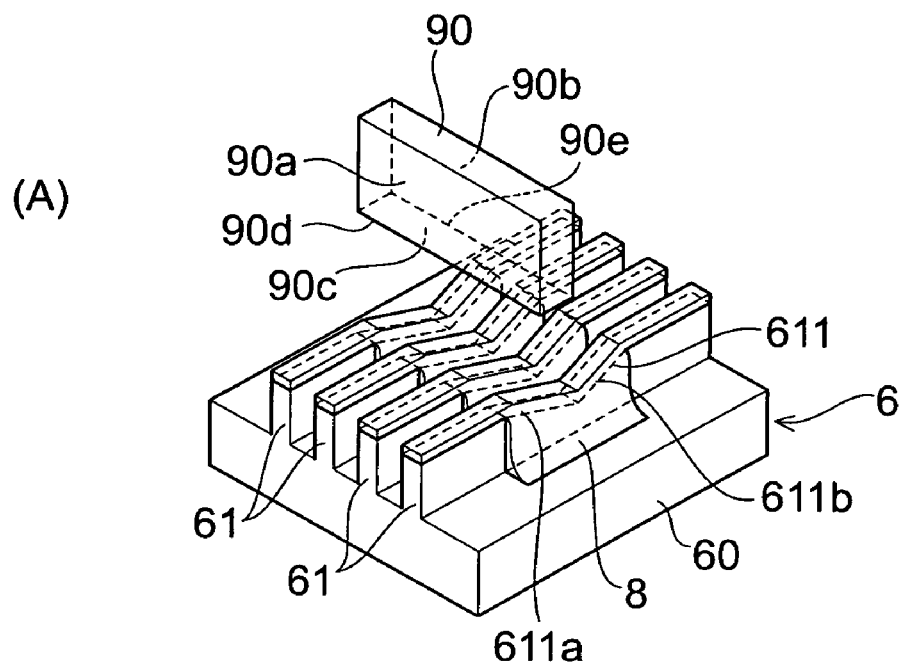
Figure 10:
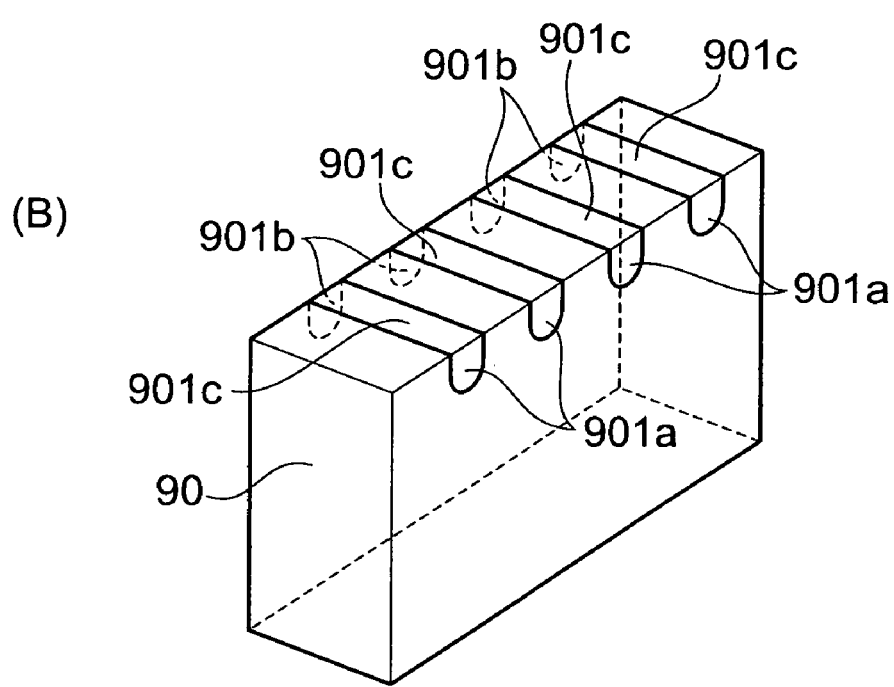

Another external electrode forming method, which is the second embodiment of the present invention, will be described below. The external electrode forming method of the present embodiment is a method for simultaneously forming a plurality of external electrodes on a chip. The second embodiment is different mainly in the used jigs, such as the application bed and blades, from the first embodiment. FIGS. 8 to 10 are views for explaining the procedure of the external electrode forming method of the present embodiment. The external electrode forming method of the present embodiment will be described with reference to FIGS. 8 to 10.

First, an application bed 6 and a blade 7 are prepared ((A) in FIG. 8). The application bed 6 is comprised of a base 60 and four platelike members 61. The platelike members 61 are attached to the base 60 so that they are parallel to each other at intervals. Grooves 611 of a V-shaped cross section are formed at the same position in the respective platelike members 61.

The blade 7 is comprised of a base 70 and a scraper 71. Teeth 711 are formed in the scraper 71. The teeth 711 are formed so that they can be put into between the platelike members 61 of the application bed 6.

Subsequently, the conductive paste 8 is delivered so as to cover across the grooves 611 of the V-shaped cross section in the respective platelike members 61 of the application bed 6 ((B) in FIG. 8). Therefore, the conductive paste 8 is filled in the grooves 611 of the V-shaped cross section in the respective platelike members 61 (preparation step).

Subsequently, relative movement is effected between the blade 7 and the application bed 6 so as to bring the blade 7 into contact with the application bed 6 ((A) in FIG. 9). This movement results in inserting each of the teeth 711 of the blade 7 into between the platelike members 61 of the application bed 6. The blade 7 and the application bed 6 are formed so that a clearance is made between the upper ends of the platelike members 61 and the roots located between the teeth 711, in a state in which the tips of the teeth 711 are in contact with the base 60 of the application bed 6. Therefore, the conductive paste 8 is pushed out through the clearance onto the platelike members 61.

Subsequently, the blade 7 is moved along the platelike members 61 to scrape out the conductive paste 8 present between the platelike members 61 ((B) in FIG. 9, removal step). Since the conductive paste 8 is fluid, the conductive paste 8 remaining in the grooves 611 of the V-shaped cross section in the platelike members 61 flows out into between the platelike members 61 ((C) in FIG. 9). Therefore, the conductive paste 8 is left along the grooves 611 of the V-shaped cross section in the platelike members 61.

Subsequently, a chip 90 is located across the grooves 611 of the V-shaped cross section in the respective platelike members 61 and immediately above the grooves 611 of the V-shaped cross section ((A) in FIG. 10, element preparation step). The chip 90 is held as pasted to an adhesive tape (not shown) provided on a holding plate (not shown) as in the first embodiment.

Subsequently, the holding plate is moved vertically downward to locate the chip 90 at a position where the tip thereof is inserted in the grooves 611 of the V-shaped cross section. Subsequently, relative movement is effected between the holding plate and the application bed 6 so as to bring a side face 90a of the chip 90 closer to wall surfaces 611a of the respective grooves 611 of the V-shaped cross section (contact step). This results in bringing a ridgeline 90d between the side face 90a and an end face 90c of the chip 90 into contact with the wall surfaces 611a of the respective grooves 611. At this time, angles of contact between the side face 90a of the chip 90 and the wall surfaces 611a of the respective grooves 611 are acute. As in the first embodiment, further relative movement may be effected between the holding plate and the application bed 6. By controlling the angles of contact, the length of the electrode portions formed on the side face 90a of the chip 90 can be controlled in the direction away from the ridgeline.

Subsequently, from the state in which the ridgeline 90d between the side face 90a and the end face 90c of the chip 90 is in contact with the wall surfaces 611a of the respective grooves 611, the chip 90 is moved along the wall surfaces 611a of the grooves 611 and toward the aperture side of the grooves 611 to scrape off the conductive paste 8 attached to the application bed 6. By controlling a distance of movement of the chip 90, the length of electrode portions formed on the side face 90a of the chip 90 can be controlled in the direction away from the ridgeline.

Furthermore, the chip 90 is moved away from the wall surfaces 611a so as to separate the ridgeline 90d between the side face 90a and the end face 90c of the chip 90 from the wall surfaces 611a of the grooves 611 (formation step). This results in forming electrode portions on the side face 90a and the ridgeline 90d of the chip 90.

Subsequently, the chip 90 is located across the grooves 611 of the V-shaped cross section in the respective platelike members 61 and immediately above the grooves 611 of the V-shaped cross section. Subsequently, the holding plate is moved vertically downward to locate the chip 90 at a position where the tip thereof is inserted in the grooves 611 of the V-shaped cross section.

Subsequently, relative movement is effected between the holding plate and the application bed 6 so as to bring another side face 90b of the chip 90 closer to wall surfaces 611b of the grooves 611 of the V-shaped cross section (contact step). This results in bringing a ridgeline 90e between the side face 90b and the end face 90c of the chip 90 into contact with the wall surfaces 611b of the respective grooves 611. At this time, angles of contact between the side face 90b of the chip 90 and the wall surfaces 611b of the respective grooves 611 are acute. As in the first embodiment, further relative movement may be effected between the holding plate and the application bed 6. By controlling the contact angles, the length of electrode portions formed on the side face 90b of the chip 90 can be controlled in the direction away from the ridgeline.

Subsequently, from the state in which the ridgeline 90e between the side face 90b and the end face 90c of the chip 90 is in contact with the wall surfaces 611b of the respective grooves 611, the chip 90 is moved along the wall surfaces 611b of the grooves 611 and toward the aperture side of the grooves 611 to scrape off the conductive paste 8 attached to the application bed 6. Furthermore, the chip 90 is moved to a position where the ridgeline 90e between the side face 90b and the end face 90c of the chip 90 is separated from the wall surfaces 611b of the grooves 611 (formation step). This results in forming the electrode portions 901b on the side face 90b and the ridgeline 90e of the chip 90.

Subsequently, relative movement is effected between the chip 90 and the application bed so as to locate the chip 90 above portions except for the grooves 611 of the platelike members 61. After that, relative movement is effected between the chip 90 and the application bed 6 so as to bring the chip 90 into contact with the portions except for the grooves 611 of the platelike members 61. When the tip of the chip 90 is brought into contact with the portions except for the grooves 611 of the platelike members 61, electrode portions are formed so as to connect between the electrode portions 901a and the electrode portions 901b.

Subsequently, the chip 90 is moved away from the application bed 6 and the chip 90 is dried, whereby the external electrodes are formed each in a configuration in which the electrode portion 901a, the electrode portion 901b, and the electrode portion 901c between the electrode portions 901a and 901b connect with each other ((B) in FIG. 10).

In the present embodiment, as described above, each of the side faces 90a, 90b of the chip 90 is moved toward the wall surfaces 611a or wall surfaces 611b of the respective grooves 611 facing the side face, to bring each of the ridgelines 90d, 90e of the chip 90 into contact with the wall surfaces 611a or 611b of the respective grooves 611. This makes the angles of contact acute between the side face 90a of the chip 90 and the wall surfaces 611a of the grooves 611 or between the side face 90b of the chip 90 and the wall surfaces 611b of the grooves 611. Since each of the ridgelines 90d, 90e of the chip 90 is moved along the wall surfaces 611a or 611b and toward the aperture side in the state in which it is kept in contact with the wall surfaces 611a or 611b of the grooves 611, the electrode portions can be stably formed in the intended shape. After the electrode portions 901a and the electrode portions 901b are formed, the electrode portions are formed so as to connect between them, and thus the electrode portions can be stably formed.

The method is arranged to control the moving distance of each of the ridgelines 90d, 90e of the chip 90 along the wall surfaces 611a or 611b and toward the aperture side in the state in which it is kept in contact with the wall surfaces 611a or 611b of the grooves 611. This permits us to control the length of the electrode portions formed on the side face 90a and on the side face 90b of the chip 90 in the direction away from the ridgeline.

In the present embodiment, the electrode portions 901a and electrode portions 901b are formed alongside at a plurality of locations so as to correspond to each other, and the electrode portions are formed so as to connect between the corresponding electrode portions 901a and electrode portions 901b. This permits us to form the stable external electrodes efficiently.

In the present embodiment, the conductive paste 8 is filled in the grooves 611 of the platelike members 61 arranged along each other, and the conductive paste 8 present between the platelike members 61 is then removed. This causes the excess conductive paste 8 filled in the grooves 611 to flow out. Therefore, the conductive paste 8 can be left along the wall surfaces of the grooves 611 of the respective platelike members 61.

The first and second embodiments were described above using the groove of the V-shaped cross section, as an example of the groove with the wall surfaces inclined outward in the direction from the interior toward the aperture. Without having to be limited to this example, the groove may be any groove with wall surfaces inclined outward at least in the direction from the interior toward the aperture. For example, the groove may be one of a trapezoidal cross section.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of forming external electrodes of an electronic component, comprising:

a step of preparing a jig in which a plurality of platelike members, each being provided with a groove into which an element forming the electronic component can be inserted, are arranged along each other, wherein each of the grooves includes at least a first wall surface inclined outward in a direction from an interior toward an aperture;

a preparation step of filling a conductive paste in each of the grooves so as to cover across the grooves of the respective platelike members;

a removal step of removing the conductive paste existing between the platelike members and thereby leaving the conductive paste in each of the grooves, at least along the first wall surface of each groove;

an element preparation step of locating the element forming the electronic component, immediately above the grooves;

a contact step of inserting the element into the grooves so as to extend across the grooves, and moving the element toward the first wall surfaces of the respective grooves to bring a ridgeline of the element into contact with the first wall surfaces; and a formation step of moving the element in a state of the contact along the first wall surfaces of the respective grooves and toward the aperture and moving the element away from the first wall surfaces so as to separate the ridgeline at least from the first wall surfaces of the respective grooves.

* * * * *